(12) United States Patent
Pagan

(10) Patent No.: US 7,707,299 B2
(45) Date of Patent: Apr. 27, 2010

(54) DATA PACKAGE WITH RECOVERY DATA

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 11/562,135

(22) Filed: Nov. 21, 2006

(65) Prior Publication Data

US 2008/0120361 A1    May 22, 2008

(51) Int. Cl.
*G06F 15/16* (2006.01)

(52) U.S. Cl. .................. 709/230; 709/204; 709/205; 709/225; 385/514; 385/331; 385/685; 370/390

(58) Field of Classification Search .......... 709/230, 709/204, 205, 226; 395/514, 331, 681; 370/390
See application file for complete search history.

(56) References Cited

U.S. PATENT DOCUMENTS

| 6,311,209 | B1 * | 10/2001 | Olson et al. ........... 709/204 |
| 2002/0152271 | A1 | 10/2002 | Chafle et al. |
| 2004/0111441 | A1 | 6/2004 | Saito et al. |
| 2007/0147371 | A1 * | 6/2007 | Radha et al. ........... 370/390 |

FOREIGN PATENT DOCUMENTS

| JP | 2005092288 A2 | 4/2005 |
| JP | 2005115943 A2 | 4/2005 |
| WO | 0233575 | * 4/2002 |
| WO | 0233575 A2 | 4/2002 |
| WO | 2004090762 A1 | 10/2004 |
| WO | 20040909762 | * 10/2004 |

OTHER PUBLICATIONS

Unknown, "News Rover Has Full Built-in Support For RAR and PAR File Archives," http://www.newsrover.com/support_rar.htm, S&H Computer Systems, 2005, pp. 1-5.

* cited by examiner

*Primary Examiner*—Tammy T Nguyen
(74) *Attorney, Agent, or Firm*—Cynthia Seal; Hoffman Warnick LLC

(57) ABSTRACT

An improved solution for communicating content over a network, such as a peer-to-peer network, is provided. In an embodiment of the invention, when content is published in a data package for sharing with other peers on the network, recovery data is included in the data package. Subsequently, a peer can receive a combination of content and recovery data and generate the remaining content using the recovery data. In this manner, a peer will not be prevented from obtaining content by missing a single slice of content, resulting in a higher success rate for content transmissions.

15 Claims, 4 Drawing Sheets

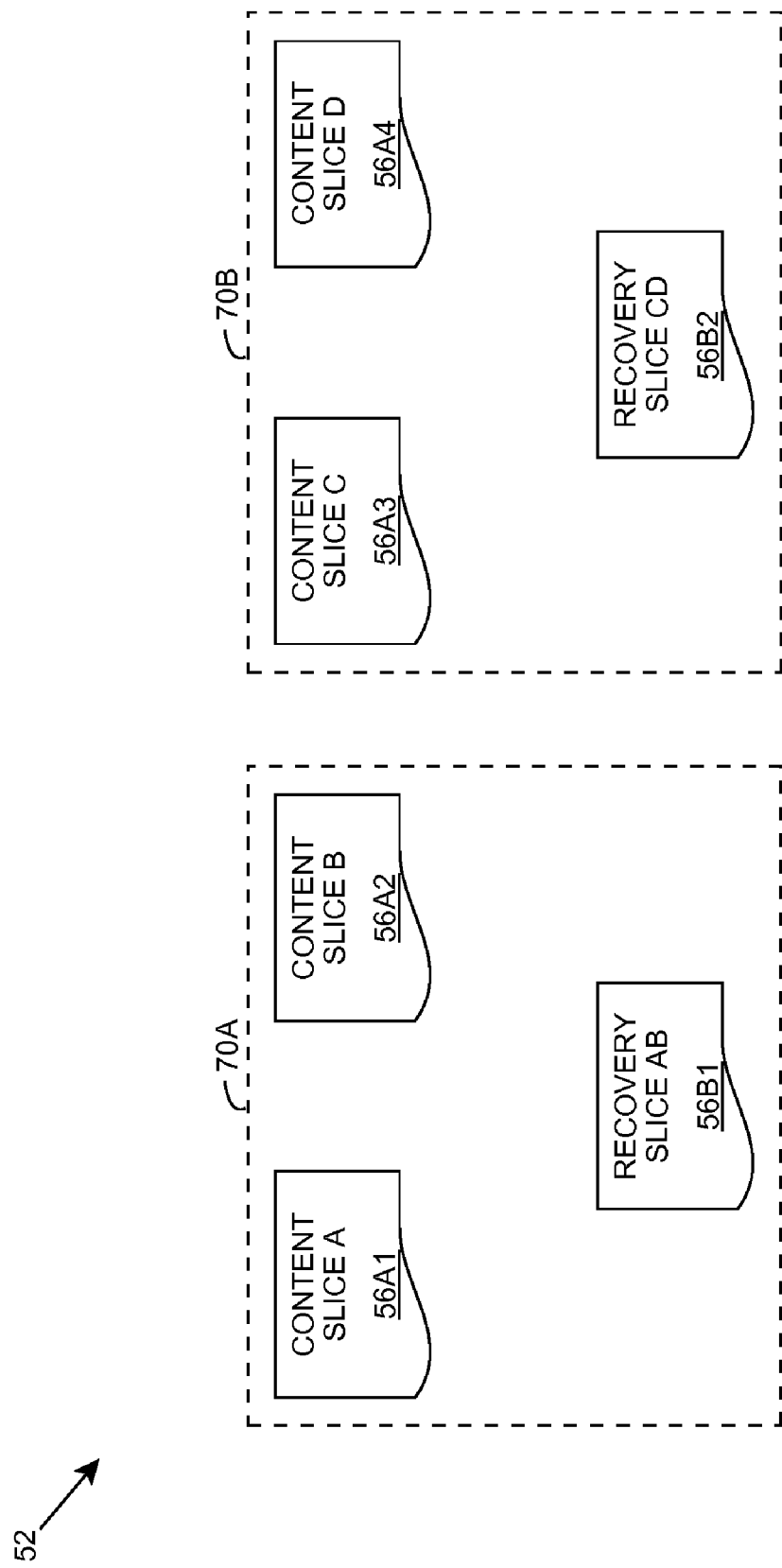

DATA PACKAGE WITH RECOVERY DATA

FIELD OF THE INVENTION

Aspects of the invention relate generally to communicating over a peer-to-peer network, and more particularly, to a solution for generating a data package that includes recovery data.

BACKGROUND OF THE INVENTION

In a peer-to-peer (P2P) network, a data package often is divided into slices and each connection between peers is responsible for delivering a part of the data package (e.g., one or more of the slices). In general, this approach provides an effective, fast delivery of the entire data package to a requesting peer. However, a problem may occur when one or more slices are not available. For example, a particular slice of the data package may not have been propagated to as many peers as other slices (i.e., have a low distribution). Additionally, the peer on which the original data package was published may not be available to provide the complete data package.

As a result, the requesting peer may need to wait an extended period of time for the slice to become available, e.g., when a peer completes other transmission(s), reconnects, and/or the like. To this extent, it is not uncommon for a requesting peer in a P2P network to fail to receive a small portion of a data package. In this case, the request for the data package may time out or the user may give up on receiving the data package, which results in the request for the data package failing. Such a failure decreases a user's satisfaction using the P2P network, and can increase network traffic due to a retry or the like.

In other types of data sharing environments, such as a Usenet Reader, a user also can publish a set of parity recovery files with a set of archived segment files. In this case, another user can request each of the set of archived segment files and parity recovery files for download. Should the download of an archived segment file fail or be corrupted, one or more parity recovery files can be used to recreate the content. However, this is limited in that the requesting user must request each individual file (archived segment or parity recovery) for download.

In view of the foregoing, a need exists to overcome one or more of the deficiencies in the related art.

BRIEF SUMMARY OF THE INVENTION

Aspects of the invention provide an improved solution for communicating content over a network, such as a peer-to-peer network. In an embodiment of the invention, when content is published in a data package for sharing with other peers on the network, recovery data is included in the data package. Subsequently, a peer can receive a combination of content and recovery data and generate the remaining content using the recovery data. In this manner, a peer will not be prevented from obtaining content by missing a single slice of content, resulting in a higher success rate for content transmissions.

A first aspect of the invention provides a method of communicating content over a network, the method comprising: obtaining recovery data based on the content; and generating a data package for communication over the network, the data package including the content and the recovery data.

A second aspect of the invention provides a system for communicating content over a network, the system comprising: a system for obtaining recovery data based on the content; and a system for generating a data package for communication over the network, the data package including the content and the recovery data.

A third aspect of the invention provides a computer program comprising program code stored on a computer-readable medium, which when executed, enables a computer system to implement a method of communicating content over a network, the method comprising: obtaining recovery data based on the content; and generating a data package for communication over the network, the data package including the content and the recovery data.

A fourth aspect of the invention provides a method of generating a system for communicating content over a network, the method comprising: providing a computer system operable to: obtain recovery data based on the content; and generate a data package for communication over the network, the data package including the content and the recovery data.

A fifth aspect of the invention provides a method of obtaining content, the method comprising: receiving a portion of a data package, the data package including the content and recovery data for the content and the portion including at least some of the recovery data and not including at least some of the content; and generating the at least some of the content using the at least some of the recovery data.

A sixth aspect of the invention provides a system for communicating content over a network, the system comprising: a system for receiving a portion of a data package, the data package including the content and recovery data for the content and the portion including at least some of the recovery data and not including at least some of the content; and a system for generating the at least some of the content using the at least some of the recovery data.

A seventh aspect of the invention provides a computer program comprising program code stored on a computer-readable medium, which when executed, enables a computer system to implement a method of communicating content over a network, the method comprising: receiving a portion of a data package, the data package including the content and recovery data for the content and the portion including at least some of the recovery data and not including at least some of the content; and generating the at least some of the content using the at least some of the recovery data.

An eighth aspect of the invention provides a method of generating a system for communicating content over a network, the method comprising: providing a computer system operable to: receive a portion of a data package, the data package including the content and recovery data for the content and the portion including at least some of the recovery data and not including at least some of the content; and generate the at least some of the content using the at least some of the recovery data.

A ninth aspect of the invention provides a business method for communicating content over a network, the business method comprising managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 4 shows an illustrative data package according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for communicating content over a network, such as a peer-to-peer network. In an embodiment of the invention, when content is published in a data package for sharing with other peers on the network, recovery data is included in the data package. Subsequently, a peer can receive a combination of content and recovery data and generate the remaining content using the recovery data. In this manner, a peer will not be prevented from obtaining content by missing a single slice of content, resulting in a higher success rate for content transmissions. As used herein, unless otherwise noted, the term "set" means one or more (i.e., at least one) and the phrase "any solution" means any now known or later developed solution.

Figure 1:
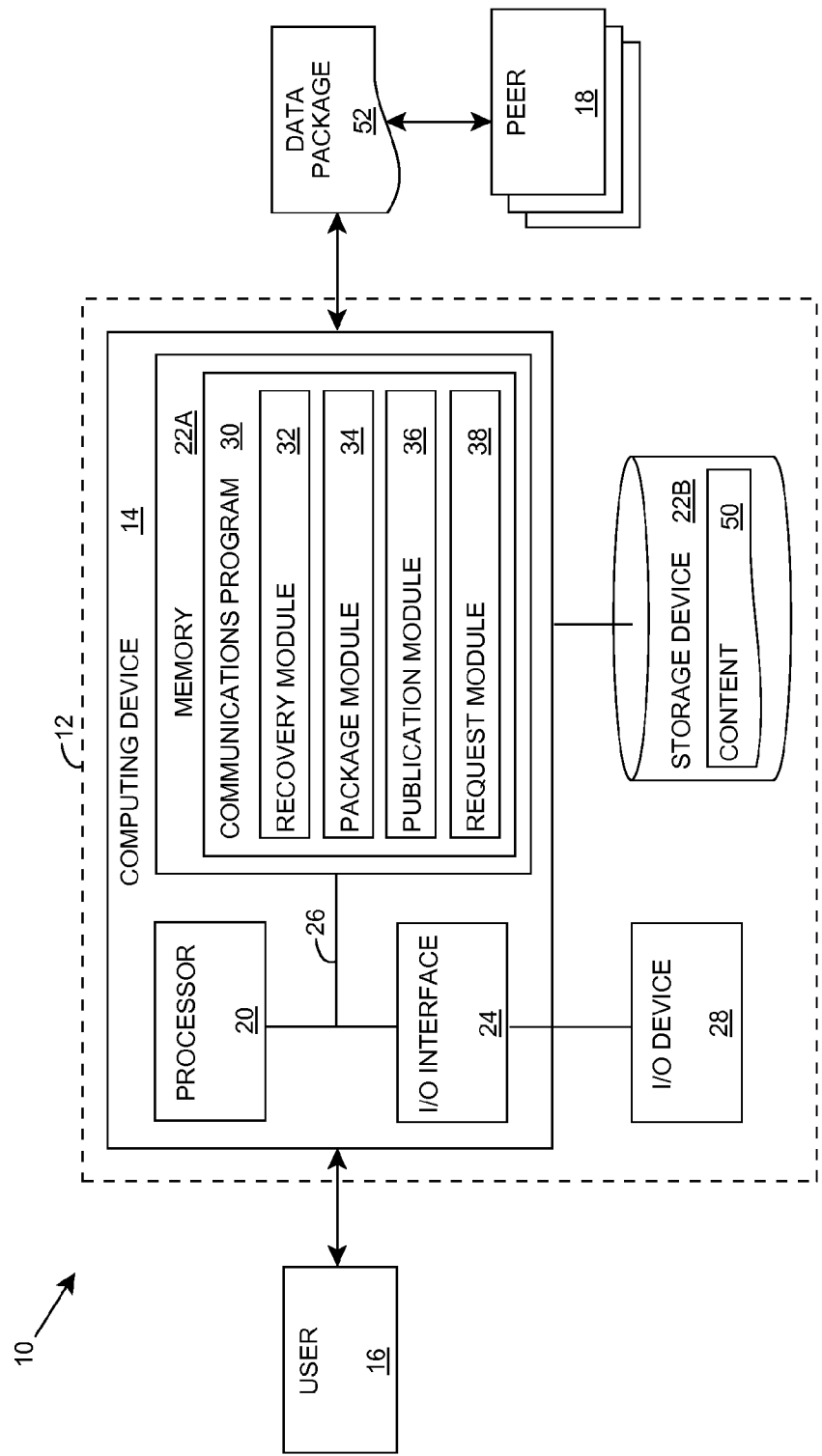
FIG. 1 shows an illustrative environment for communicating content over a network according to an embodiment of the invention.

Turning to the drawings, FIG. 1 shows an illustrative environment 10 for communicating content 50 over a network according to an embodiment of the invention. To this extent, environment 10 includes a computer system 12 that can perform the process described herein in order to communicate content 50. In particular, computer system 12 is shown including a computing device 14 that comprises a communications program 30, which makes computing device 14 operable to communicate content 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as communications program 30, which is stored in a storage system, such as memory 22A and/or storage device 22B. While executing program code, processor 20 can read and/or write data, such as content 50, to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user, such as a peer 18, to communicate with computing device 14 using any type of communications link.

In any event, computing device 14 can comprise any general purpose computing article of manufacture capable of executing program code installed thereon. However, it is understood that computing device 14 and communications program 30 are only representative of various possible equivalent computing devices that may perform the process described herein. To this extent, in other embodiments, the functionality provided by computing device 14 and communications program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, communications program 30 enables computer system 12 to communicate content 50 over a network. To this extent, communications program 30 is shown including a recovery module 32, a package module 34, a publication module 36, and a request module 38. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, aspects of the invention provide a solution for communicating content 50 over a network. The network can comprise any combination of public and/or private networks. In an embodiment of the invention, the network comprises a peer-to-peer (P2P) network. The P2P network can comprise a private network and/or can comprise a public network, such as the Internet. In any event, computer system 12 can comprise a peer in the P2P network and can share content 50 with other peers 18 on the P2P network. Additionally, computer system 12 can obtain shared content from one or more of the peers 18. It is understood that each peer 18 can be configured similar to computer system 12. The configuration of peers 18 has not been shown for clarity.

Content 50 can comprise any type of electronic data. For example, content 50 can comprise a single data file that includes electronic data stored in any compressed or uncompressed format. However, it is understood that content 50 can be embodied in any number of data files and/or other storage solutions. Content 50 can be shared between peers 12, 18 using any solution. For example, in a P2P network, computer system 12 can communicate/receive all of content 50 to/from a single peer 18 or can communicate/receive only a portion of content 50 to/from peer 18 while one or more other peers provide other portion(s) of content 50.

To share content 50, communications program 30 can generate a data package 52. Data package 52 can comprise a single object that encapsulates all of content 50, regardless of the number of data files and/or storage formats used to store content 50. Subsequently, data package 52 can be requested by one or more other users (e.g., via a peer 18) and communicated to the requesting user(s). In an embodiment of the invention, communications program 30 publishes data package 52 to the network (e.g., P2P network) in order to enable other users (e.g., peers 18) to request and obtain data package 52. It is understood that communications program 30 can publish data package 52 using any solution, e.g., by storing data package 52 in a shared area (e.g., folder) of storage device 22B, notifying a public directory of the availability of data package 52, and/or the like.

Figure 2:
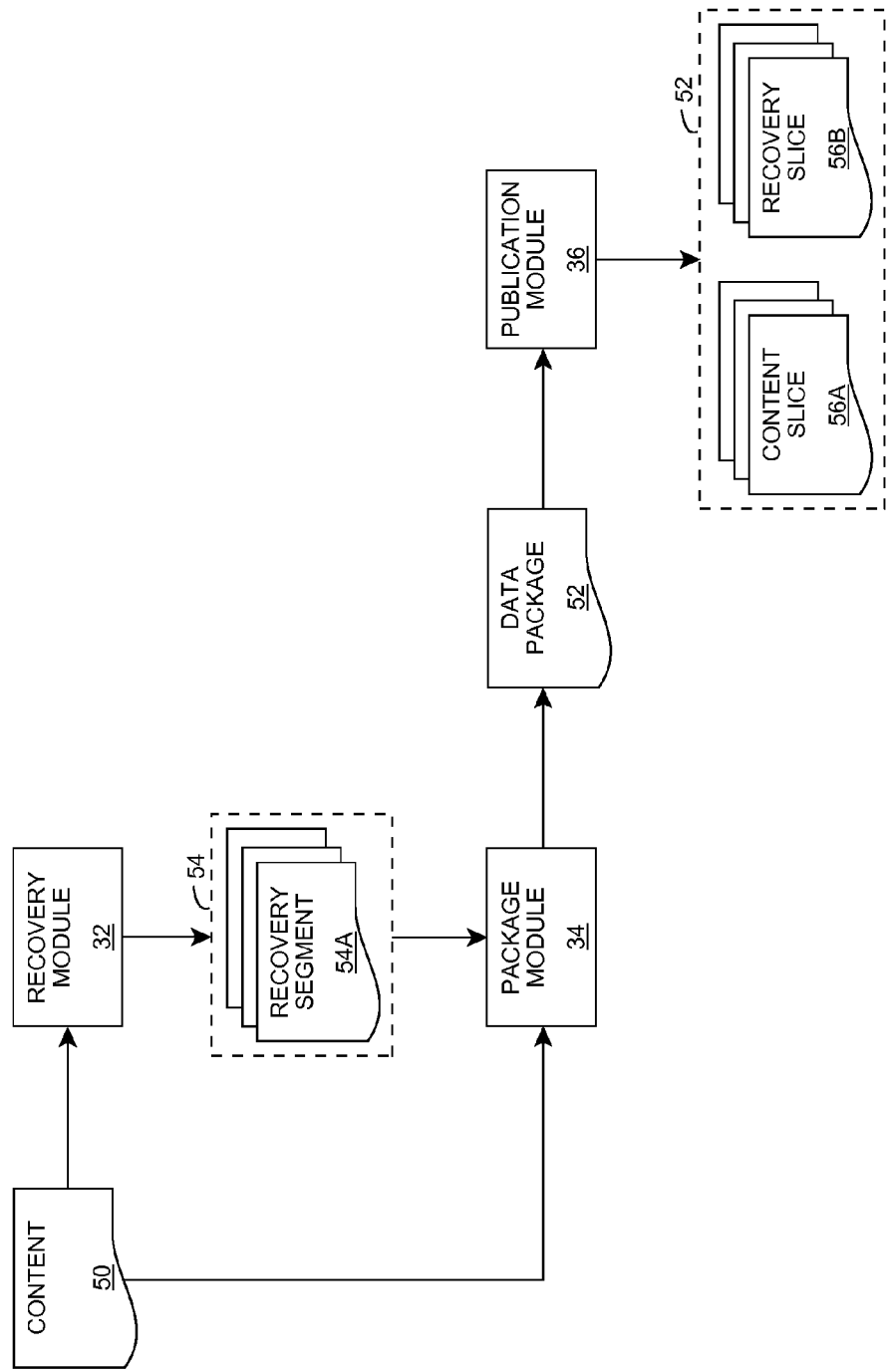
FIG. 2 shows an illustrative data flow for publishing a data package using the modules of the communications program shown in FIG. 1 according to an embodiment of the invention.

Aspects of the invention provide an improved solution for generating data package 52. To this extent, FIG. 2 shows an illustrative data flow for publishing data package 52 using the modules of communications program 30 (FIG. 1) according to an embodiment of the invention. For example, a user 16 (FIG. 1) can request to share content 50 with other users on a network. In response, recovery module 32 can obtain recovery data 54 based on content 50. In an embodiment of the invention, recovery module 32 generates recovery data 54. Alternatively, recovery module 32 can receive recovery data 54 generated by another system (not shown). In the latter case, recovery module 32 can provide content 50 to the other system, request that the other system generate recovery data 54, and receive recovery data 54 in response to the request.

In any event, recovery data 54 can comprise any type of recovery data. In an embodiment of the invention, recovery data 54 comprises a set of recovery segments 54A, such as a set of parity recovery segments (e.g., PAR or PAR2 files). However, it is understood that recovery data 54 can utilize any type of data/file recovery protocol. Regardless, recovery data 54 can enable some or all of content 50 to be regenerated. For example, when only a portion of content 50 is received/not corrupted, recovery data 54 can be used to regenerate the portion of content 50 that was not received/corrupted. When recovery data 54 includes multiple recovery segments 54A, each segment 54A can be used to regenerate a portion of content 50. Recovery data 54 can enable content 50 to be regenerated by using recovery data 54 alone and/or recovery data 54 in combination with a portion of content 50.

Package module 34 generates data package 52 using content 50 and recovery data 54. In particular, package module 34 can generate a data package 52 that includes both content 50 and recovery data 54. As a result, data package 52 will require more storage space than a data package 52 that includes only content 50 (assuming the same data compression solution, if any, is used). For example, when recovery data 54 comprises parity recovery segments, recovery data 54 could be up to 50% the size of content 50, which would result in a data package 52 having a size that is approximately 50% larger. However, it is understood that various solutions may result in higher/lower portion of recovery data 54 with respect to content 50. Further, it is understood that communications program 30 could enable user 16 to select an amount of recovery data 54 that can be added to content 50 in data package 52. To this extent, a smaller amount of recovery data 54 may require a larger percentage of content 50 to be received by a peer 18.

In an embodiment of the invention, content 50 and recovery data 54 each comprise a plurality of files that package module 34 encapsulates within data package 52. In another embodiment of the invention, content 50 comprises a single data file, and package module 34 appends recovery data 54 to the single data file. In the latter case, data package 52 comprises a single data file that includes both content 50 and recovery data 54. Regardless, it is understood that package module 34 can combine and/or split files in content 50 and/or recovery data 54 using any solution.

It is understood that package module 34 can implement any of various solutions for generating data package 52 based on a type of network and/or solution used in sharing data package 52. To this extent, data package 52 can include additional information, such as a header/trailer that includes an identification, description, and/or the like, of content 50 and/or an original source (e.g., user 16 and/or computer system 18) of content 50. In this manner, peers 18 can obtain a user-friendly and unique identification of content 50 in a data package 52, track multiple copies of data package 52, and/or the like. Still further, it is understood that package module 34 can encrypt and/or otherwise secure/protect some or all of the data (content 50 and recovery data 54) in data package 52 using any solution.

Regardless, publication module 36 can publish data package 52 to the network. For example, publication module 36 can store data package 52 in a shared portion of storage device 22B (FIG. 1), provide an identification of data package 52 to a public directory, and/or the like. In some content sharing environments, publication module 36 may divide data package 52 into a plurality of data slices 56A-B. For example, when a total size of data package 52 exceeds a maximum slice size for the sharing environment, publication module 36 may generate two or more data slices 56A-B, each of which includes a unique portion of data package 52.

Each data slice 56A-B can include any combination of content 50 and/or recovery data 54. In an embodiment of the invention, publication module 36 generates a set of content slices 56A, each of which includes at least a portion of content 50, and a set of recovery slices 56B, each of which includes at least a portion of recovery data 54. To this extent, publication module 36 can generate slices 56A-B that include only content 50 or recovery data 54, but not both.

Further, publication module 36 also can assign a transmission priority to one or more data slices 56A-B based on data in the data slice(s) 56A-B. The transmission priority can be used when a computer system 12 (FIG. 1) is providing data slices 56A-B to a peer 18 (FIG. 1). In particular, communications program 30 (FIG. 1) can provide data slices 56A-B having a higher transmission priority for use on peer 18 first, and subsequently provide data slices 56A-B having a lower transmission priority. To this extent, when data slices 56A-B include recovery slices 56B, publication module 36 can assign a higher transmission priority to recovery slices 56B than that for content slices 56A. In this manner, recovery slices 56B will tend to be more thoroughly propagated throughout the network (e.g., a P2P network) and will be more likely to be received by a requesting peer 18. When a recovery slice 56B can be used to re-generate content 50 in multiple content slices 56A, the receipt of a recovery slice 56B increases the likelihood that the entire content 50 can be obtained, regardless of whether all content slices 56A are received. Similarly, when a content slice 56A can be recovered by the use of recovery slice 56B and another content slice 56A, the content slice 56A can be assigned a lower transmission priority.

FIG. 4 shows an illustrative data package 52 according to an embodiment of the invention. In particular, data package 52 includes four content slices 56A1-4, and two recovery slices 56B1-2. Each recovery slice 56B1-2 can include parity data for a corresponding two content slices 561-4. To this extent, recovery slice 56B1 can include parity data for content slices 56A1-2, and recovery slice 56B2 can include parity data for content slices 56A3-4. In this case, each recovery slice, such as recovery slice 56B1, can be used in conjunction with one of the corresponding content slices 56A1-2 to recreate another of the corresponding content slices 56A1-2. As a result, upon receipt of any two slices in each group 70A-B, a peer 18 (FIG. 1) can obtain all of the content 50 (FIG. 1) for the group 70A-B.

Figure 3:
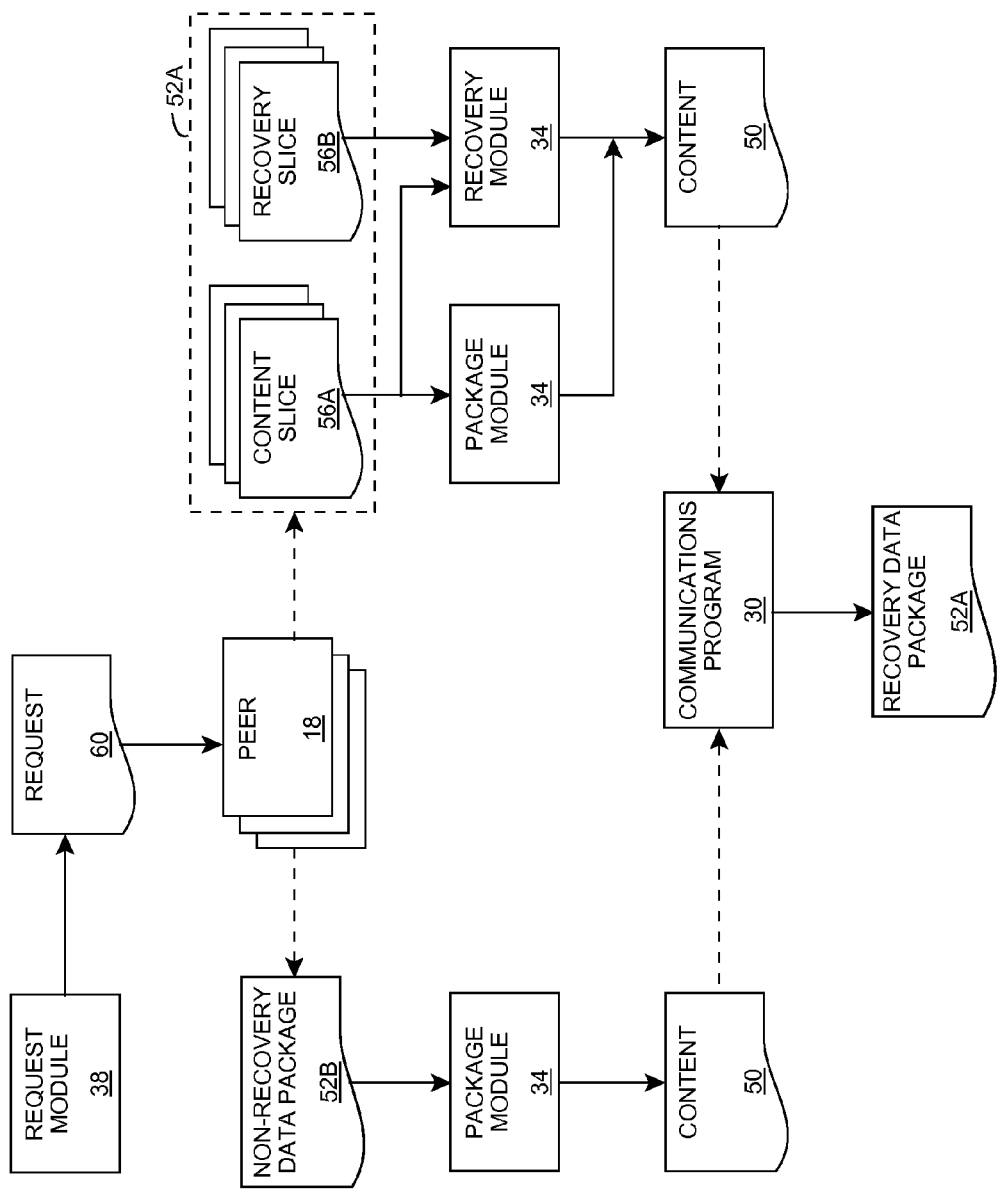
FIG. 3 shows an illustrative data flow for obtaining content using the modules of the communications program shown in FIG. 1 according to an embodiment of the invention.

Aspects of the invention provide a solution for obtaining content 50 (FIG. 1) on a destination computer system 12 (FIG. 1). To this extent, FIG. 3 shows an illustrative data flow for obtaining content 50 using the modules of communications program 30 (FIG. 1) according to an embodiment of the invention. Initially, request module 38 can generate a request 60 for content 50, which can be communicated for processing by a set of peers 18 on the network. Request 60 can identify content 50 using any solution. For example, request 60 can include a unique identifier for a data package 52 (FIG. 1) that includes content 50. In an embodiment of the invention, the fact that data package 52 includes recovery data is hidden from a user 16 (FIG. 1). In this case, user 16 does not need to be concerned about whether or what portion of recovery data should/needs to be requested.

In any event, one or more peers 18 that include some or all of the requested data package 52 (FIG. 1) can communicate at least a portion of the data package 52 for processing on computer system 12 (FIG. 1). FIG. 3 illustrates two possible types of data packages 52A-B that may be communicated to computer system 12 in response to request 60. In particular, computer system 12 may receive a recovery data package 52A or a non-recovery data package 52B. Communications program 30 (FIG. 1) can process either type of data package 52A-B as described herein.

When computer system 12 (FIG. 1) receives some or all of a recovery data package 52A, computer system 12 may receive both content 50 and recovery data 54 (FIG. 2). For example, as discussed herein, recovery data package 52A may include a set of content slices 56A and a set of recovery slices 56B, each of which includes content 50 and recovery data 54, respectively. Regardless, package module 34 can process the portion of data package 52A that includes content 50 (e.g., each content slice 56A) and extract at least a portion of content 50 from data package 52A. For example, package module 34 can remove any identifying information for data package 52A and/or content slice 56A, process any required security (e.g., private key, password, and/or the like), decompress, and/or the like.

Similarly, recovery module 34 can process the portion of data package 52A that includes recovery data 54 (e.g., each recovery slice 56B) and generate a portion of content 50, possibly with the use of a portion of content 50 (e.g., one or more content slices 56A that have been received). In this manner, content can be obtained on computer system 12 (FIG. 1) without obtaining all of data package 52A. For example, computer system 12 can recreate content 50 using recovery data 54 (FIG. 1) and a portion of content 50.

To this extent, when recovery data 54 (FIG. 1) can re-generate a portion of content 50 after a corresponding portion of content 50 has been received (e.g., recovery data 54 comprises parity data for two corresponding portions of content 50), computer system 12 (FIG. 1) only needs to receive approximately 50% of content 50 and all of recovery data 54. In this case, computer system 12 can stop obtaining content slices 56A after all recovery slices 56B have been received and at least 50% of content slices 56A have been received. As a result, while the published data package 52A is larger, the actual amount of data transferred over the network in response to a request 60 from computer system 12 is approximately the same. To help ensure that all recovery data 54 is obtained at computer system 12, recovery slices 56B can have a higher transmission priority as described herein. Additionally, it is understood that any combination of content 50 and recovery data 54 (FIG. 2) can be received, depending on the particular data recovery solution implemented.

In an embodiment of the invention, communications program 30 (FIG. 1) manages the receipt of content slice(s) 56A and recovery slice(s) 56B in a manner that is hidden from user 16 (FIG. 1). To this extent, each slice 56A, 56B can be stored in a temporary location and processed accordingly to generate content 50. For example, communications program 30 can manage the receipt of slices in each group 70A-B (FIG. 4) of a recovery data package 52A. In this case, once at least two slices from each group 70A-B in recovery data package 52A have been received, communications program 30 can stop receiving slices and process the slices to obtain content 50. Once processed, communications program 30 can delete slices 56A, 56B. In this manner, user 16 remains unaware of what portion of content 50 was received and what portion of content 50 was re-generated using recovery data 54 (FIG. 2).

Alternatively, computer system 12 (FIG. 1) may receive a non-recovery data package 52B. Non-recovery data package 52B comprises a data package that does not include any recovery data 54 (FIG. 2) as described herein. In this case, package module 34 can process non-recovery data package 52B using any solution to obtain content 50. However, when non-recovery data package 52B includes multiple content slices 56A, package module 34 will need to obtain each content slice 56A in order to obtain all of content 50.

Computer system 12 (FIG. 1) can automatically supplement a non-recovery data package 52B available on a network with a recovery data package 52A for the same content. To this extent, after obtaining content 50 from a non-recovery data package 52B, communications program 30 can automatically generate a recovery data package 52A for content 50 as discussed herein. Similarly, after receiving at least a portion of recovery data package 52B, communications program 30 can automatically generate a complete recovery data package 52A (e.g., generate any slices that were not received for each group 70A-B (FIG. 4)). In either case, communications program 30 can subsequently publish the recovery data package 52A on the network for sharing with other peers 18 (FIG. 1).

While shown and described herein as a method and system for communicating content 50 over a network, it is understood that the invention further provides various alternative embodiments. For example, in one embodiment, the invention provides a computer program stored on a computer-readable medium, which when executed, enables a computer system to communicate content 50 over a network, such as a P2P network. To this extent, the computer-readable medium includes program code, such as communications program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for communicating content 50 over a network, such as a P2P network. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages a network, such as a P2P network, which enables users to perform the process described herein on a subscription, advertising, and/or fee basis. That is, a service provider could offer to manage a network and/or a computer system 12 (FIG. 1) that allows users to communicate content 50 as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of communicating content over a network, the method comprising:
   obtaining recovery data based on the content, wherein the recovery data enables regeneration of at least some of the content that is not available;
   generating a data package on a first peer on the network for communication over the network, the data package including the content and the recovery data;
   publishing the data package to the network for processing by a second peer on the network;
   receiving a portion of the data package at the second peer on the network, the portion including at least some of the recovery data and not including at least some of the content; and
   generating the at least some of the content not included using the at least some of the recovery data at the second peer on the network.

2. The method of claim 1, further comprising generating a plurality of data slices based on the data package.

3. The method of claim 2, wherein the plurality of data slices includes:
   a content slice including at least a portion of the content; and
   a recovery slice including at least a portion of the recovery data.

4. The method of claim 3, further comprising assigning a transmission priority to the plurality of data slices, wherein the recovery slice has a higher transmission priority than the content slice.

5. The method of claim 1, the data package comprising a single data file.

6. The method of claim 1, further comprising:
   receiving a non-recovery data package over the network; and
   obtaining the content from the non-recovery data package.

7. The method of claim 1, the recovery data including a set of parity recovery segments.

8. A method of obtaining content, the method comprising:
   receiving a portion of a data package on a first peer over a network, the data package including the content and recovery data for the content and the portion including at least some of the recovery data and not including at least some of the content, wherein the recovery data enables regeneration of at least some of the content that is not available;
   generating the at least some of the content not included on the first peer using the at least some of the recovery data;
   generating the data package for communication over the network on a second peer on the network; and
   publishing the data package at the second peer on the network to the network.

9. The method of claim 8, further comprising requesting the data package from a set of peers on a peer-to-peer network.

10. The method of claim 8, the receiving including:
    receiving a content slice including a portion of the content; and
    receiving a recovery slice including at least a portion of the recovery data.

11. A system for communicating content over a network, the system comprising:
    at least one computing device;
    a system for obtaining recovery data based on the content, wherein the recovery data enables regeneration of at least some of the content that is not available;
    a system for generating a data package for communication over the network, the data package including the content and the recovery data;
    a system for publishing the data package to the network for processing by a peer on the network;
    a system for receiving a portion of requested content, the portion including at least some recovery data for the requested content and not including at least some of the requested content; and
    a system for generating the at least some of the requested content not included using the at least some of the recovery data.

12. The system of claim 11, further comprising a system for generating a plurality of data slices based on the data package.

13. The system of claim 12, wherein the system for generating the plurality of data slices further assigns a transmission priority to a data slice based on data in the data slice.

14. The system of claim 11, wherein the network comprises a peer-to-peer network.

15. A computer program comprising program code stored on a computer-readable storage medium, which when executed, enables a computer system to implement a method of communicating content over a network, the method comprising:

obtaining recovery data based on the content, wherein the recovery data enables regeneration of at least some of the content that is not available;

generating a data package for communication over the network, the data package including the content and the recovery data;

publishing the data package to the network for processing by a peer on the network;

receiving a portion of requested content, the portion including at least some recovery data for the requested content and not including at least some of the requested content; and generating the at least some of the requested content not included using the at least some of the recovery data.

* * * * *